(12) United States Patent
Luo et al.

(10) Patent No.: US 9,963,798 B2
(45) Date of Patent: May 8, 2018

(54) SEALED LAMINATED STRUCTURE

(71) Applicant: General Electric Company

(72) Inventors: Yuefeng Luo, Mechanicville, NY (US); William Edward Adis, Scotia, NY (US); Michael Lewis Jones, Scotia, NY (US)

(73) Assignee: General Electric Company, Schenectady, NY (US)

( * ) Notice: Subject to any disclaimer, the term of this patent is extended or adjusted under 35 U.S.C. 154(b) by 287 days.

(21) Appl. No.: 14/797,700

(22) Filed: Jul. 13, 2015

(65) Prior Publication Data

US 2015/0315717 A1  Nov. 5, 2015

Related U.S. Application Data

(62) Division of application No. 13/572,055, filed on Aug. 10, 2012, now abandoned.

(51) Int. Cl.
*C25D 9/04* (2006.01)
*C25D 11/00* (2006.01)
(Continued)

(52) U.S. Cl.
CPC .......... *C25D 9/04* (2013.01); *B23H 3/00* (2013.01); *B23H 9/02* (2013.01); *C25D 9/06* (2013.01);
(Continued)

(58) Field of Classification Search
CPC .......... B23H 3/00; B23H 9/02; C25D 11/005; C25D 11/024; C25D 11/36; C25D 17/00;
(Continued)

(56) References Cited

U.S. PATENT DOCUMENTS 2,590,927 A * 4/1952 Brandt ............... C25F 3/02
148/253
3,544,390 A 12/1970 Labib et al.
(Continued)

FOREIGN PATENT DOCUMENTS

EP  0756297 A1 * 1/1997 ........... C21D 8/1283
FR  2737388 A1 * 2/1997 ............. A01K 87/06

OTHER PUBLICATIONS

FR 2737388 A1, Feb. 1997, Machine translation.*
(Continued)

*Primary Examiner* — Satya B Sastri
(74) *Attorney, Agent, or Firm* — Ernest G. Cusick; Hoffman Warnick LLC

(57) ABSTRACT

Various embodiments include a sealed laminated metal structure. This laminated metal structure has a metal layer, where the metal layer has a first surface and an opposite second surface. A material is laminated on each of the first and second surfaces of the metal layer. In some cases, the laminated metal structure is removed from a larger laminated sheet of metal. The laminated metal structure is subjected to alternating current electrolytic deburring and cleaning to remove any burrs along the perimeter edge. After deburring and cleaning, a sealer, which is a phosphate compound, is deposited on the perimeter edge of the laminated metal structure where the metal is exposed using alternating current.

11 Claims, 7 Drawing Sheets

(51) Int. Cl.
*C25D 17/00* (2006.01)
*C25F 3/16* (2006.01)
*B23H 9/02* (2006.01)
*C25F 3/02* (2006.01)
*C25F 3/06* (2006.01)
*C25F 7/00* (2006.01)
*B23H 3/00* (2006.01)
*C25D 9/06* (2006.01)
*C25D 9/08* (2006.01)
*C25D 11/02* (2006.01)
*C25D 11/36* (2006.01)

(52) U.S. Cl.
CPC .............. *C25D 9/08* (2013.01); *C25D 11/005* (2013.01); *C25D 11/024* (2013.01); *C25D 11/36* (2013.01); *C25D 17/00* (2013.01); *C25F 3/02* (2013.01); *C25F 3/06* (2013.01); *C25F 3/16* (2013.01); *C25F 7/00* (2013.01)

(58) Field of Classification Search
CPC .... C25D 9/04; C25D 9/06; C25D 9/08; C25F 3/02; C25F 3/06; C25F 3/16; C25F 7/00
See application file for complete search history.

(56) References Cited

U.S. PATENT DOCUMENTS

| | | | |
|---|---|---|---|
| 4,326,933 | A | 4/1982 | Sabatka et al. |
| 4,369,221 | A | 1/1983 | Bennett |
| 6,143,155 | A | 11/2000 | Adams et al. |
| 6,328,872 | B1 | 12/2001 | Talieh et al. |
| 6,409,904 | B1 | 6/2002 | Uzoh et al. |
| 6,979,391 | B1 | 12/2005 | Hubel |
| 7,918,983 | B2 | 4/2011 | Saijo et al. |
| 2011/0073485 | A1 | 3/2011 | Luo et al. |
| 2012/0222968 | A1 | 9/2012 | Luo et al. |

OTHER PUBLICATIONS

EP 0756297 A1, Jan. 1997, Derwent Ab.*
Polley, Office Action Communication for U.S. Appl. No. 14/062,341, dated Nov. 20, 2015, 40 pages.
Patent Cooperation Treaty, Notification of Transmittal of the International Search Report and the Written Opinion of the International Searching Authority for PCT/US2013/053709 dated Feb. 18, 2014, 9 pages.
Cohen, Office Action Communication for U.S. Appl. No. 13/572,055 dated Mar. 13, 2014, 21 pages.
Cohen, Office Action Communication for U.S. Appl. No. 13/572,055 dated Jul. 1, 2014, 25 pages.
Cohen, Office Action Communication for U.S. Appl. No. 13/572,055 dated Oct. 23, 2014, 15 pages.
Cohen, Office Action Communication for U.S. Appl. No. 13/572,055 dated Mar. 12, 2015, 16 pages.

* cited by examiner

SEALED LAMINATED STRUCTURE

CROSS-REFERENCE TO RELATED APPLICATION

This application is a divisional application of U.S. patent application Ser. No. 13/572,055, filed Aug. 10, 2012, which is hereby incorporated by reference in its entirety.

FIELD OF THE INVENTION

The invention generally relates to a sealed laminated structure along with the system and method for electrolytically processing a laminated structure to deburr and seal the laminated structure.

BACKGROUND OF THE INVENTION

Electrical generators may be used in power plants, cogeneration plants, vehicles, or in other articles of manufacture that convert energy into electrical energy. These electrical generators may contain thin sheets of metal, which are laminated with a thin coating on each side of the thin metal sheet and are generally called "laminations". The laminations are used in the core of the electrical generator and other electrical equipment to reduce parasitic eddy currents within the generator. Generally, the laminations are cut or stamped from a larger sheet of thin metal that has been previously coated with the thin coatings on each side of the metal prior to cutting or stamping. However, such cutting or stamping from a larger sheet may result in the formation of burrs along the cut edges of each lamination.

Typically, the burrs along the edges of the laminations are removed using time-consuming, imprecise, costly and difficult processes. Processes typically used to deburr along the edges of the lamination include sanding, grinding and other similar mechanical deburring processes. The difficulty in these processes is exasperated by the thinness of the metal sheets and the coatings on the surfaces of the metal. However, these processes not only remove the burrs, these processes may also remove the coating layers on the thin metal. As a result, the laminations prepared by mechanical processes may have insulation damage, which may result in eddy currents in the generator and generator core failure.

Further, the coatings placed on the thin metal may on occasion be applied to a surface of the thin metal that may have metal particles, which may have been missed in the cleaning process prior to coating of the metal. In that situation, the coating will be thin in the area of the metal particle or the metal particle may extend through the surface of the coating. When these metal particles are present on the surface of the lamination, the lamination may be prone to electrical shorting where the metal particles are present.

SUMMARY OF THE INVENTION

Generally stated, provided is a sealed laminated metal structure. This laminated metal structure has a metal layer, where the metal layer has a first surface and an opposite second surface. A material is laminated on each of the first and second surfaces of the metal layer. Typically, the laminated metal structure is removed from a larger laminated sheet of metal. The laminated metal structure has a perimeter edge with metal of the metal layer exposed along at least a portion of the perimeter edge. The laminated metal structure is subjected to alternating current electrolytic deburring and cleaning to remove any burrs along the perimeter edge. After deburring and cleaning, a sealer, which is a phosphate compound, is deposited on the perimeter edge of the laminated metal structure where the metal is exposed.

In addition, provided is a system having an electrolytic deburring and cleaning tool for cleaning a workpiece, and an electrolytic sealing tool for depositing a sealer on the workpiece. The electrolytic deburring and cleaning tool has a first electrode, a second electrode, a first electrolyte supply configured to supply a first electrolyte between the first electrode and the workpiece, a second electrolyte supply configured to supply a second electrolyte between the second electrode and the workpiece, and a power supply configured to supply alternating current to the first and second electrodes. The first electrolyte and the second electrolyte are electrically insulated from one another, and the workpiece makes the electrical connection between the first electrode and the second electrode through the first electrolyte and the second electrolyte, respectively. The electrolytic sealing tool has a first electrode, a second electrode, a first electrolyte supply configured to supply a first sealer electrolyte between the first electrode and the workpiece, a second electrolyte supply configured to supply a second sealer electrolyte between the second electrode and the workpiece, and a power supply configured to supply alternating current to the first and second electrodes. The first sealer electrolyte and the second sealer electrolyte are electrically insulated from one another, and the first and second sealer electrolyte each contain a component capable of being deposited on the workpiece to seal deburred and cleaned sections of the workpiece. The workpiece makes the electrical connection between the first electrode and the second electrode through the first sealer electrolyte and the second sealer electrolyte, respectively.

Also provided is a method of processing a workpiece. The method includes electrolytically deburring and cleaning the workpiece using alternating current to form a deburred and cleaned workpiece, by contacting the workpiece simultaneously with a first electrolyte and a second electrolyte, wherein the first electrolyte and the second electrolyte are electrically insulated from one another. An alternating current is supplied between a first electrode and a second electrode, where the first electrode is in communication with the first electrolyte, and the second electrode is in communication with the second electrolyte. The method further includes electrolytically sealing the deburred and cleaned workpiece by contacting the deburred and cleaned workpiece simultaneously with a first sealing electrolyte and a second sealing electrolyte, where the first sealing electrolyte and the second sealing electrolyte are electrically insulated from one another. An alternating current is supplied between a first electrode and a second electrode, where the first electrode is in communication with the first sealing electrolyte, and the second electrode is in communication with the second sealing electrolyte.

In addition, embodiments of the present disclosure provide a sealed laminated metal structure comprising: a lamination comprising a metal layer, the metal layer having a first surface and an opposite second surface, a first electrically insulative coating laminated onto the first surface of the metal layer; a second electrically insulative coating laminated onto the second surface of the metal layer, the lamination having a perimeter edge with an exposed portion of the metal layer positioned at least partially along the perimeter edge, wherein the lamination is subject to alternating current electrolytic deburring and cleaning to remove burrs from the perimeter edge thereof, and a sealer comprising a phosphate compound deposited on the perimeter edge and the exposed portion of the metal layer.

Embodiments of the present disclosure also provide a structure including: a metal layer having a first face, an opposing second face, and a perimeter edge; a first electrically insulative coating laminated onto the first surface of the metal layer; a second electrically insulative coating laminated onto the second surface of the metal layer; a phosphate sealer deposited onto the perimeter edge of the lamination, wherein the first electrically insulative coating, the second electrically insulative coating, and the phosphate sealer enclose the metal layer such that the metal layer is free of exposed surfaces and burrs thereon, and wherein an electrolyte supply separates the metal layer, the first electrically insulative coating, the second electrically insulative coating, and the phosphate sealer from a transient electrode.

DETAILED DESCRIPTION OF THE INVENTION

To gain a better understanding of the invention, attention is directed to the Figures of the present specification.

Figure 1:
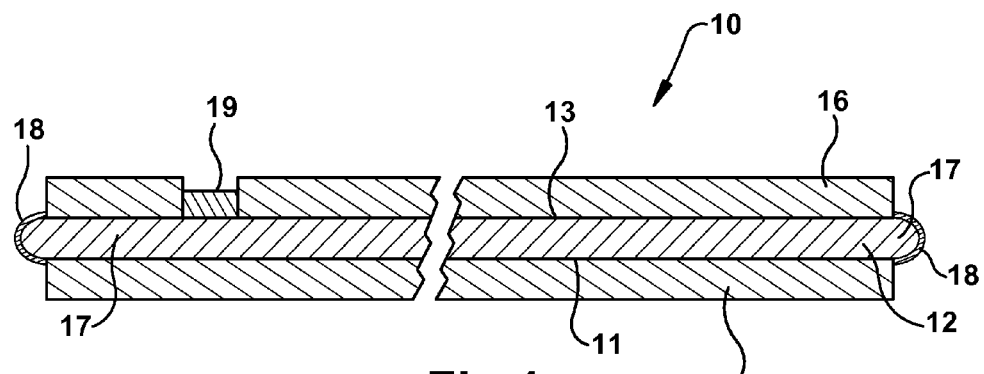
FIG. 1 shows a sealed laminate structure.

Referring to FIG. 1, shown is sealed laminate structure 10, having metal layer 12 with first side 11 and opposite second side 13. Metal layer 12 has layer 14 laminated to first side 11 and layer 16 laminated to second side 13. Each of layer 14 and layer 16 may be prepared from the same material or may be made from different materials. Metal layer 12 with layers 14 and 16 laminated thereto can be referred to as a "lamination." Sealed laminate structure 10 has perimeter edge 17 having sealer 18 covering any metal 12 that may is not covered by layer 14 or layer 16. Generally, sealer 18 will be found along at least a portion of perimeter edge 17. In addition, sealer 18 may be applied to laminate structure 10 at a location 19 where layer 14 or layer 16 fails to cover metal layer 12, as shown in FIG. 1.

Layers 14 and 16 may each independently be a single layer, shown in FIG. 1 or a multiple layers. Generally, the material of layers 14 and 16 is an electrical insulation coating. Examples of materials that may make up layers 14 and 16 include, for example, C5 coating material typically used in electric steel applications. C5 coatings contain inorganic materials that may enhance the electrical insulation properties of the coatings. Other coatings that may be used include C3 coatings, which are generally organic enamel or varnish coatings. One example of a multilayer coating is a C5+C3 coating. These layers are applied as very thin layers to metal layer 12.

Metal layer 12 may be made from a variety of metals. Generally, metal layer 12 may be made from a metal that is selected for the particular purpose in which the metal structure 10 is intended to be used. For example, in electric motors, such as for stator laminations, the metal is generally "electric steel". Electric steels may be grain oriented ("GO") or non-grain oriented ("NGO") steels. An example of electric steels is silicon iron steels.

Generally, laminations are prepared from large sheets having a metal layer 12 which have been laminated or coated with insulation layers 14 and 16. Individual laminations are removed from the large sheets by mechanical cutting, laser cutting, plasma cutting, stamping, punching or other suitable methods. Stamping or punching is typically used since the individual laminations are thin and can be easily stamped or punched out of the larger sheet. However, cutting, punching or stamping will leave perimeter edge 17 with bare metal of metal layer 12 exposed. In addition, burrs will generally be present along perimeter edge 17. Burrs are raised edges or small pieces of metal that remain attached to the cut lamination due to the cutting process.

Figure 2:
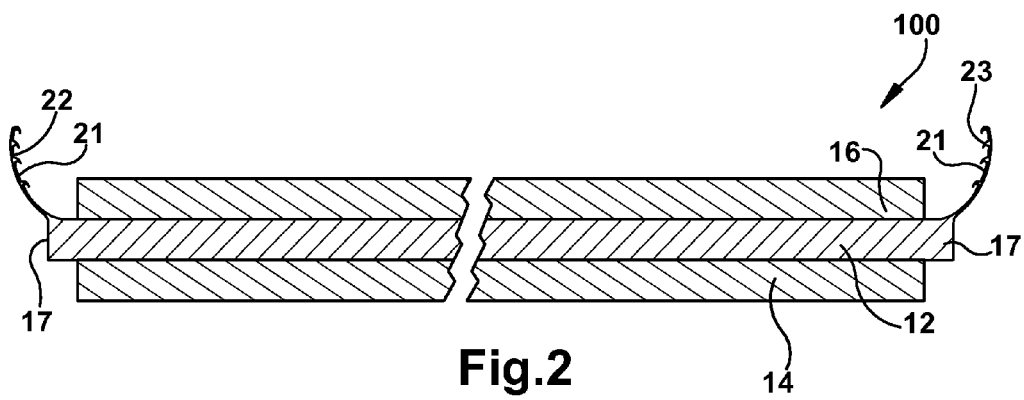
FIG. 2 shows a laminate structure removed from a larger sheet of the laminate structure with burrs.

Attention is directed to FIG. 2, where cut lamination 100 is shown. Cut lamination 100 has burrs 21 extending from perimeter edge 17 of lamination 100. These burrs 21 extend from perimeter edge 17 of metal layer 12 and may extend towards layers 14 or 16 or may extend outward from metal layer 12 generally in a direction perpendicular to metal layer 12. When punching is used as the method to remove laminations from a larger laminated metal sheet, generally the burrs 21 will extend in the direction of the punch and towards one of layers 14, 16 laminated to metal layer 12. As shown, burr 21 may be a standing burr 22 or a hair burr 23. It is desirable to remove burrs from the lamination since burrs may cause damage to the machine that the lamination is placed. Removing burrs provides advantages, including by not limited to, reducing the introduction of debris in the machine, and in the case of generators, preventing electrical shorts.

Once lamination 100 is removed from a larger laminated sheet, lamination 100 is then subjected to a deburring process and sealing process. To accomplish the deburring and sealing, a system having an electrolytic deburring tool and an electrolytic sealing tool is used. Electrolytic deburring and electrolytic sealing using the system of the electrolytic deburring tool and the electrolytic sealing tool is described below will result in the sealed laminate structure shown in FIG. 1.

Figure 3:
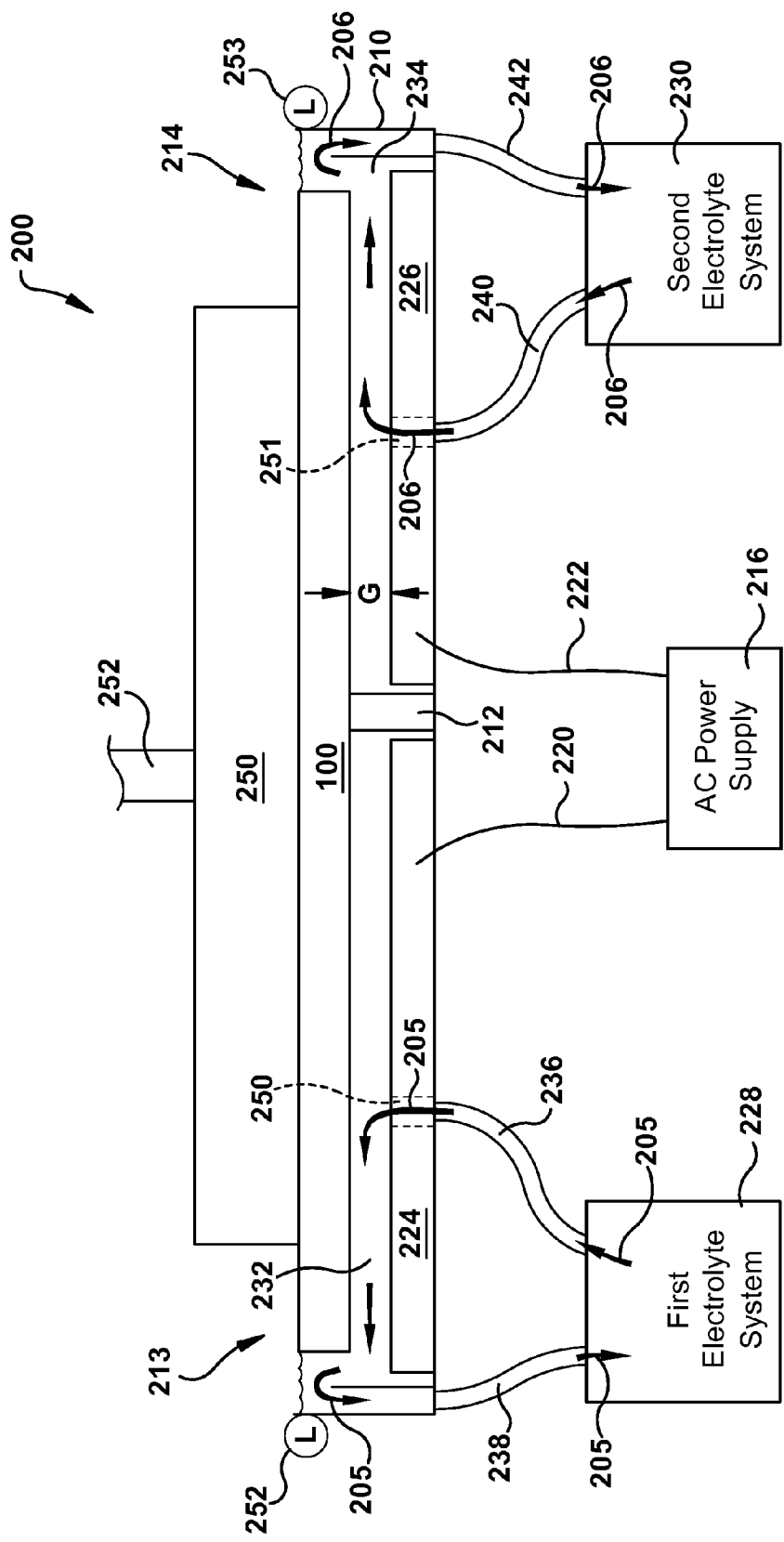
FIG. 3 shows a schematic view of an electrolytic deburring tool.

To remove burrs 21 from lamination or workpiece 100, workpiece 100 is subjected to electrolytic deburring process using electrolytic deburring tool 200 shown in FIG. 3. Deburring tool 200 has tank 210 with divider 212, which divides tank 210 into first cell 213 and second cell 214. Also present is an alternating current (AC) power supply 216, which has extending therefrom first wire 220 connected to first electrode 224 and second wire 222 connected to second electrode 226. First electrode 224 is positioned in first cell 213 and second electrode 226 is positioned in second cell 214. First cell 213 contains first electrolyte 232 and is insulated from the second cell 214 of tank 210 by divider 212. Second cell 214 contains second electrolyte 234. Also provided in electrolytic deburring tool 200 is first electrolyte system 228 and second electrolyte system 230. Contained in first electrolyte system 228 are first electrolyte 232, which is circulated through first electrolyte system 228, first electrolyte supply 236 and first electrolyte return 238. First electrolyte supply 236 conveys the first electrolyte 232 from first electrolyte system 228 to first cell 213, while first electrolyte return 238 returns first electrolyte 232 from first cell 213 to the first electrolyte system 228. Contained in second electrolyte system 230 are second electrolyte 234, which is circulated through second electrolyte system 230, second electrolyte supply 240 and second electrolyte return 242. Second electrolyte supply 240 and second electrolyte return 242 function in a similar manner to first electrolyte supply 236 and first electrolyte return 238, as described above. Also present are a lamination holder 250 and machine connector 252.

Power supply 216 generates an alternating current (AC) at a particular frequency, current, and voltage. For example, the frequency of the AC may be less than approximately 1000 Hertz, 750 Hertz, 500 Hertz or 0.1 Hertz. Generally, the frequency may be selected at any frequency within the range of about 0.1 Hertz to about 1000 Hertz. At greater frequencies, the AC may cause the effective resistance of conductive material in the electrolytic deburring tool 200 to increase. In certain embodiments, the current and/or voltage of the AC generated by the power supply 216 may be adjustable. In further embodiment (not shown), the AC from the power supply 216 may be passed through a transformer (not shown), which may be used to change the voltage and/or current of the AC. For example, the transformer may step down the voltage supplied by the power supply 216. In other embodiments, the transformer may be omitted or included in the power supply 216. In addition to the power supply, a power supply controller may be used to adjust the frequency, voltage and current generated by the power supply. The voltage wave generated by power supply 216 may be rectangular or sinusoidal.

Connected to power supply 216 is first power wire 220 and second power wire 222. First and second power wires 220 and 222 supply the AC to first electrode 224 and second electrode 226, respectively. When the AC flows toward first or second electrodes 224 or 226, the electrode function as a transient cathode. When AC flows away from first or second electrodes 224 or 226, the electrode function as a transient anode. Thus, as the AC alternately flows toward and away from first and second electrodes 224 and 226, the electrodes alternately function as the transient cathode and the transient anode. In other words, first electrode 224 functions as the transient cathode for approximately half of the time and as the transient anode for the other half of the time. Similarly, second electrode 226 functions as the transient cathode for approximately half of the time and as the transient anode the other half of the time. Further, when first electrode 224 functions as the transient cathode, second electrode 226 functions as the transient anode. Similarly, when first electrode 224 functions as the transient anode, second electrode 226 functions as the transient cathode. First and second electrodes 224 and 226 may be made from bi-polar and stable electrode materials such as, but not limited to, graphite, lead, titanium, niobium, iridium, platinum, ruthenium, or combinations thereof. The combination of these materials may be in the form of an alloy or in the form of a coating. In addition, first and second electrodes 224 and 226 may be inert. In other words, first and second electrodes 224 and 226 may not dissolve when the electrodes function as the transient anode.

Tank 210 may be a single tank divided into first cell 213 first and second cell 214, divided by divider 212. Alternatively, tank 210 may be two separate tanks, where one tank forms first cell 213 and a second tank forms second cell 214. In any event, whether a single tank or multiple tanks, tank 210 may be made from non-conductive materials such as, but not limited to, plastic, glass, fiberglass, rubber and the like, to help prevent current leakage through grounding connections. As described in more detail below, first and second electrolytes 232 and 234 carry the current to or from electrodes 224 and 226, respectively. Examples of materials that may be used as first and second electrolytes 232 and 234 include, but are not limited to, sodium nitrate, sodium chloride, or a combination (mixture) thereof. In certain embodiments, first and second electrolytes 232 and 234 may be the same. In other embodiments, the first and second electrolytes 232 and 234 may be different from one another.

Coupled to first cell 213 is first electrolyte system 228. As described in detail below, the first electrolyte system 228 includes various components to store, transfer, filter, and control a flow rate or pressure of the first electrolyte 232. Examples of such components include pumps, motors, filters, piping, valves, sensors, and so forth. First electrolyte supply 236 (e.g., conduit) is coupled to the discharge of first electrolyte system 228 to carry first electrolyte 232 to first cell 213. A first electrolyte nozzle (not shown) may optionally be coupled to an end of the first electrolyte supply 236. The first electrolyte nozzle may be configured to focus the flow of the first electrolyte 232 to a particular location in first cell 213. Both first electrolyte supply 236 and the first electrolyte nozzle, if present, may be made from non-conductive materials similar to that used for the tank 210, such as, but not limited to, plastic, rubber or fiberglass. A first electrolyte return 238 (e.g., conduit) may be coupled to an outlet of first cell 213 of tank 210. First electrolyte return 238 carries first electrolyte 232 from tank 210 to the first electrolyte system 228. First electrolyte return 238 may also be made from non-conductive materials similar to that used for the first electrolyte supply 236. As shown in FIG. 3, first electrolyte 232 generally flows in a loop between first cell 213 and first electrolyte system 228, as designated by arrows 205.

A second electrolyte system 230 may be coupled to second cell 214. Examples of components that may be included in second electrolyte system 230 include, but are not limited to, pumps, motors, filters, piping, valves, sensors, and so forth. The configuration of second electrolyte system 230 may be similar to that of the first electrolyte system 228. Specifically, second electrolyte 234 flows from second electrolyte system 230 through second electrolyte supply 240 (e.g., conduit) and then optionally to a second electrolyte nozzle (not shown). Second electrolyte 234 then flows from second cell 214 through a second electrolyte return 242 (e.g., conduit) may be coupled to an outlet of second cell 214. Second electrolyte return 242 carries second electrolyte 234 from tank 210 to the second electrolyte system 230. As with the first electrolyte system 228, the various components of second electrolyte system 230 and the components coupled to second electrolyte system 230, including conduits 240 and 242 may be made from non-conductive materials such as, but not limited to, plastic, rubber or fiberglass. As shown in FIG. 3, second electrolyte 234 generally flows in a loop between second cell 214 and second electrolyte system 230, as designated by arrows 206.

Deburring tool 201 may further have workpiece holder 250, which is adapted to hold the workpiece (lamination) 100 in place before, during and after deburring. Workpiece holder 250 is generally made from a material that is non-conductive. Workpiece holder 250 may hold workpiece 100 in place by using a vacuum, a permanent magnet or electromagnetic components. Other similar methods may be used so long as the method of holding the workpiece 100 to workpiece holder 250 does not interfere with the deburring process.

Connected to workpiece holder 250 is machine connector 252, which is connected to a means to lower workpiece (lamination) 100 into electrolyte 232, 234 for deburring. For example, machine connector 252 may be directly or indirectly connected to a motor, a mechanical lever or other similar mechanisms that can effectively lower workpiece (lamination) 100 into and out of electrolyte 232, 234.

Deburring tool 200 may have additional components, such as a controller for controlling deburring tool. The controller (not shown) may be configured to receive and send various signals to control deburring tool 200. For example, the controller may generate a first electrolyte control signal that is sent to the first electrolyte system 228. The first electrolyte control signal may include various instructions for controlling the components of the first electrolyte system 228. Similarly, the controller may generate a second electrolyte control signal that is sent to the second electrolyte system 230. In addition, the first electrolyte system 228 may generate a first electrolyte sensor signal that is sent to the controller for processing. The first electrolyte sensor signal may convey information regarding various sensors included in the first electrolyte system 228. Similarly, second electrolyte system 230 may generate a second electrolyte sensor signal that is sent to the controller for processing. For example, but not limited to, the controller may send signals and receive signals to control the speed of a pump, or the concentration of the electrolytes 232 and 234 in the first and second electrolyte systems 228 and 230. Additionally, the controller may control the frequency, current and/or voltage of the power from the AC power supply 216.

Figure 4:
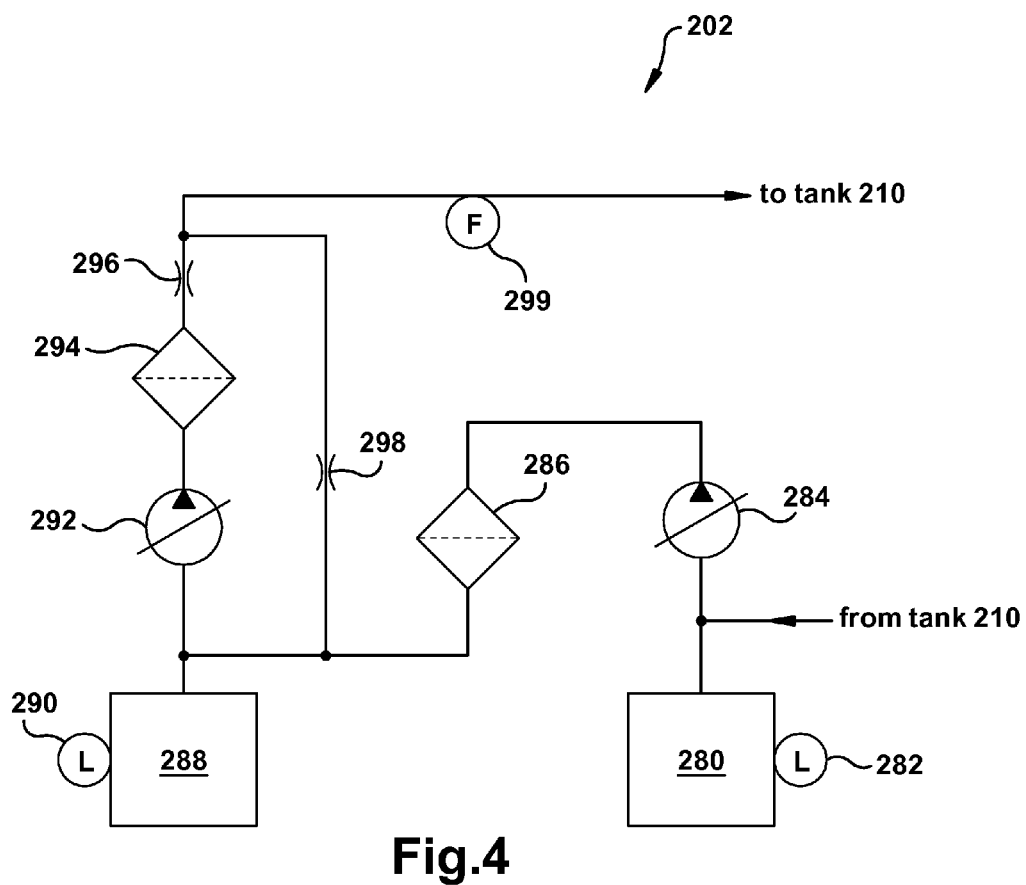
FIG. 4 shows a schematic view of the electrolyte system usable in both the deburring tool and the electrolytic sealing tool.

Turing to the electrolyte systems in more detail, attention is directed to FIG. 4, which shows a possible configuration 202 for each electrolyte system 228 and 230. It is noted that the exact configuration is not critical. Each electrolyte system 228 and 230 may include a return tank 280, which is used to store the electrolyte 232 or 234 that flows through the electrolyte return 238 or 242. As described above, all of the components of electrolyte systems 228 and 230 described herein may be made from a non-conductive material. Coupled to return tank 280 may be return tank level sensor 282, which is configured to provide a signal indicating the level of the electrolyte in return tank 280. Return tank pump 284 may be used to transfer the electrolyte out of return tank 280, or directly from the tank 210. Next, the electrolyte may flow through a return tank filter 286, which is configured to remove particulates from the electrolyte being circulated. The particulates in the electrolyte may include metal and/or metal hydroxide removed from the workpiece 100. A filter element disposed in the return tank filter 286 may be configured to trap a majority of the particulates that may be generated by the electrolytic deburring tool 200. The filtered electrolyte from the return tank filter 286 may then flow to storage tank 288. Thus, filtered and unfiltered electrolyte may be segregated from one another. Storage tank 288 may include storage tank level sensor 290, which is configured to provide a signal indicating the level of the electrolyte in storage tank 288. Storage tank pump 292 may be used to transfer the electrolyte out of the storage tank 288 or directly from return tank filter 286. Storage tank filter 294 may be disposed downstream of storage tank pump 292 to remove further particulates from electrolyte 232, 234 being cycled through the system. Thus, a filter element of storage tank filter 294 may be configured to trap particles smaller than those trapped by return tank filter 286. Control valve 296 may be disposed downstream of storage tank filter 294 and used to control a flow rate or pressure of the electrolyte through the electrolyte system 228 or 230. Storage tank bypass control valve 298 may be disposed downstream of return tank filter 286 to bypass storage tank pump 292, storage tank filter 294, and storage tank control valve 296. In other words, return tank pump 284 may be used to transfer the electrolyte 232, 234 through storage tank bypass control valve 298 and to electrolyte storage tank 288. Such a configuration may be used when storage tank 288 is not being used or is not necessary. Electrolyte flow sensor 299 may be disposed in the electrolyte supply 238 or 240 (FIG. 3) and used to provide a signal indicative of the flow rate of the electrolyte to a controller. Alternatively, the sensor 299 may be configured to provide a signal indicative of the pressure of the electrolyte.

Generally, to operate each electrolyte system 228 and 230, a controller (not shown) sends control signals to one or more of the following components: return tank pump 284, storage tank pump 292, storage tank control valve 296, and storage tank bypass control valve 298. Similarly, a return sensor signal may include signals from the return tank level sensor 282, first electrolyte flow sensor 299, and/or tank level sensor 252 and/or 253 (FIG. 3). Thus, the controller may use the sensor signals to generate control signals to maintain certain parameters of each electrolyte system 228 and 230 within set thresholds. For example, the controller may adjust storage tank control valve 296 and/or storage tank bypass control valve 298 to maintain a specified flow rate or pressure of the electrolyte 232 and/234. It is possible that each electrolyte system 228 and 230 have different configurations.

Once burrs 21 are removed from lamination or workpiece 100, workpiece 100 is subjected to electrolytic deposition/conversion process where a phosphate compound is deposited to the bare metal exposed after deburring (deposition) or the phosphate compound reacts with the bare metal of lamination (workpiece) 100 (conversion). To accomplish electrolytic deposition/conversion, electrolytic sealing tool 300, shown in FIG. 5, may be used. Electrolytic sealing tool 300 has tank 310 with divider 312, which divides tank 310 into first section or cell 313 and second section or cell 314. Also present is an alternating current (AC) power supply 316, which has extending therefrom, first wire 320 connected to first electrode 324 and second wire 322 connected to second electrode 326. First electrode 324 is positioned in first section 313 of tank 310 and second electrode 326 is positioned in second section 314 of tank 310. First section 313 is insulated from the second section 314 of tank 310 by divider 312 and first section 313 further contains first deposition electrolyte 332, while second section 314 of tank 310 contains second deposition electrolyte 334. Also provided in electrolytic sealing tool 300 is first deposition electrolyte system 378 and second deposition electrolyte system 330. Contained in first deposition electrolyte system 378 are first deposition electrolyte 332, which is circulated through first deposition electrolyte system to first section 313 of tank 310, first deposition electrolyte supply 336 and first deposition electrolyte return 338. Contained in second deposition electrolyte system 330 are second deposition electrolyte 334, which is circulated through second deposition electrolyte system 330 to second section 314 of tank 310, second deposition electrolyte supply 340 and second deposition electrolyte return 342. Also present are a lamination holder 350 and machine connector 352.

Power supply 316 generates an alternating current (AC) at a particular frequency, current, and voltage, similar to power supply 216 of the deburring tool. For example, the frequency of the AC may be less than approximately 1000 Hertz, 750 Hertz, 500 Hertz or 0.1 Hertz. Generally, the frequency may be selected at any frequency within the range of about 0.1 Hertz to about 1000 Hertz. At greater frequencies, the AC may cause the effective resistance of conductive material in the electrolytic sealing tool 300 to increase. In certain embodiments, the current and/or voltage of the AC generated by the power supply 316 may be adjustable. As with power supply 216, the AC from the power supply 316 may be passed through a transformer (not shown), which may be used to change the voltage and/or current of the AC. The transformer is an optional component of the electrolytic sealing tool. In addition to the power supply, a power supply controller may be used to adjust the frequency, voltage and current generated by the power supply. The voltage wave may be rectangular or sinusoidal.

Connected to power supply 316 is first power wire 320 and second power wire 322. First and second power wires 320 and 322 supply the AC to first electrode 324 and second electrode 326, respectively. When the AC flows toward first or second electrodes 324 or 326, the electrodes function as a transient cathode. When AC flows away from first or second electrodes 324 or 326, the electrodes function as a transient anode. Thus, as the AC alternately flows toward and away from first and second electrodes 324 and 326, the electrodes alternately function as the transient cathode and the transient anode. When first electrode 324 functions as the transient cathode, second electrode 326 functions as the transient anode. Similarly, when first electrode 324 functions as the transient anode, second electrode 326 functions as the transient cathode. First and second electrodes 324 and 326 may be made from bi-polar and stable electrode materials such as, but not limited to, graphite, lead, titanium, niobium, or combinations thereof as alloys or coatings. In addition, first and second electrodes 324 and 326 may be inert.

Tank 310 may be a single tank divided into first section 313 and second section 314 divided by divider 312. Alternatively tank 310 may be two separate tanks, where one tank forms first section 313 and a second tank forms second section 314. In any event, tank 310 may be made from non-conductive materials such as, but not limited to, plastic, glass rubber, fiberglass and the like, to help prevent current leakage through grounding connections. First section 313 of tank 310 contains first deposition electrolyte 332, and second section 314 contains second deposition electrolyte 334. As described in more detail below, first and second electrolytes 332 and 334 carry the current to or from electrodes 324 and 326, respectively. Examples of materials that may be used as first and second deposition electrolytes 332 and 334 include, but are not limited to, a composition containing a metal oxide, such as zinc oxide or manganese oxide, a combination (mixture) thereof, phosphoric acid, sodium hydroxide and sodium salt, such as sodium nitrate or sodium chloride. Other compositions are useable will be apparent to those skilled in the art, but generally will contain a source of phosphate in the electrolyte. In certain embodiments, first and second deposition electrolytes 332 and 334 may be the same. In other embodiments, the first and second deposition electrolytes 332 and 334 may be different from one another.

Figure 5:
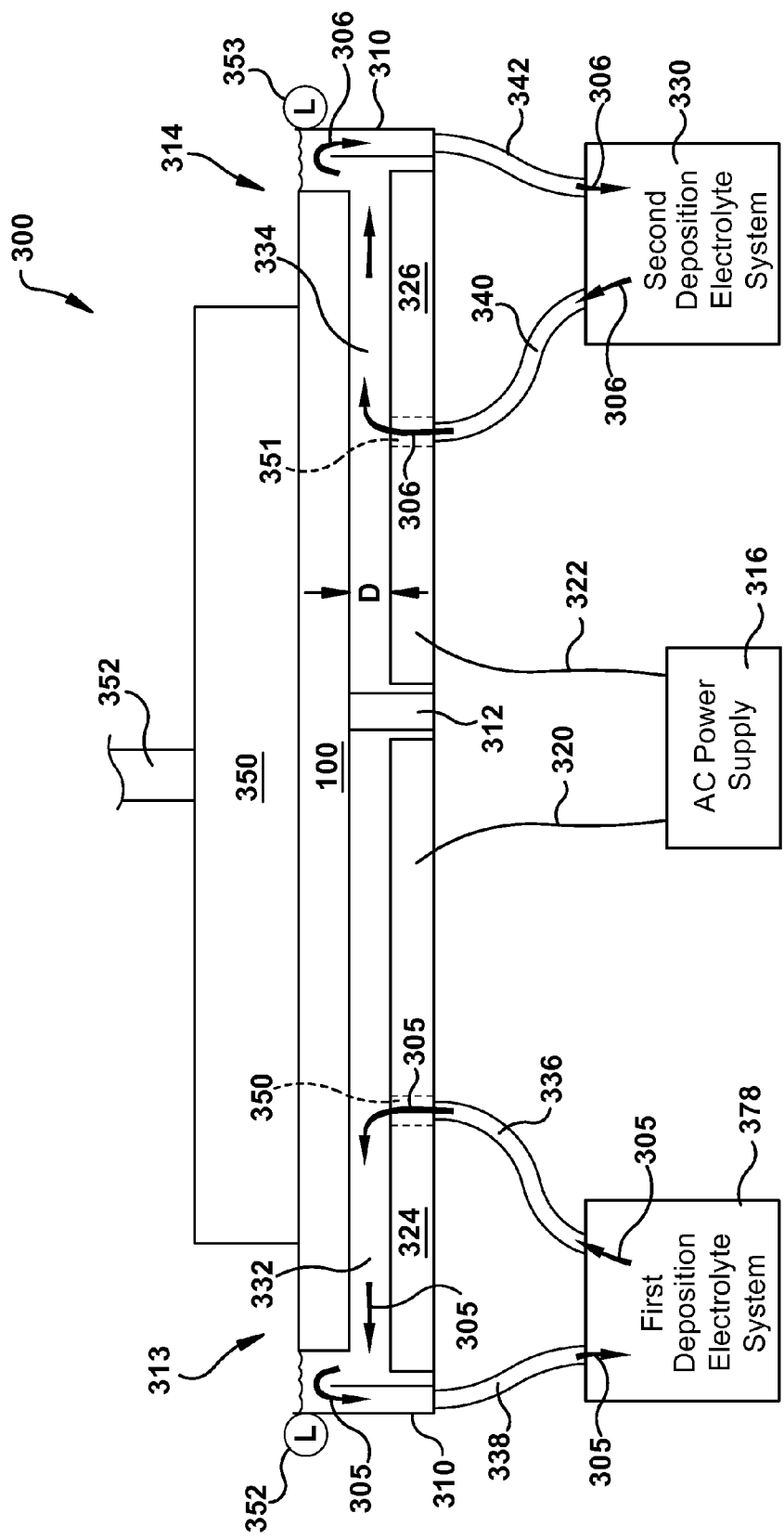
FIG. 5 shows a schematic view of an electrolytic sealing tool.

Coupled to first section 313 of tank 310 is first deposition electrolyte system 378. In a similar fashion, second section 314 of tank 310 is coupled to second deposition electrolyte system 378. Each deposition electrolyte system 378, 330 includes various components to store, transfer, filter, and control a flow rate or pressure of deposition electrolyte 332, 334. Examples of such components include pumps, motors, filters, piping, valves, sensors, and so forth. An exemplary deposition electrolytes system is shown in FIG. 4 and is described above and is essentially similar to the electrolyte systems 228 and 230 of the deburring tool. Each system 378, 330 has a deposition electrolyte supply 336, 340 (e.g., conduit) coupled to the outlet of each disposition electrolyte system 378, 330 to carry deposition electrolyte 332, 334 to each section 313, 314, respectively, of tank 310. An electrolyte nozzle (not shown) may optionally be coupled to an end of each deposition electrolyte supply 336, 340, similar to the nozzle described above for the first electrolyte 232 (in FIG. 3). In addition, each deposition electrolyte return 338, 342 (e.g., conduit) may be coupled to an outlet of first section 313 or second section 314 of tank 310, as shown in FIG. 5. Each deposition electrolyte return 338, 342 carries deposition electrolyte 332, 334 from tank 310 to the respective deposition electrolyte system 378, 330. Deposition electrolyte supplies 336, 340 and returns 338, 342 may also be made from non-conductive materials similar to that used for the first electrolyte supply 236. As shown in FIG. 5, first deposition electrolyte 332 generally flows in a loop between first section 313 of tank 310 and first deposition electrolyte system 378, as designated by arrows 305. Similarly, as shown in FIG. 5, second deposition electrolyte 334 generally flows in a loop between second section 314 of tank 310 and second deposition electrolyte system 330, as designated by arrows 306.

Electrolytic sealing tool 300 may further have workpiece holder 350, which is adapted to hold the workpiece (lamination) 100 in place before, during and after electrolytic sealing process. Workpiece holder 350 is generally made from a material that is non-conductive and may hold workpiece 100 in place by using a vacuum, a permanent magnet or electromagnetic components. Other similar methods may be used so long as the method of holding the workpiece 100 to workpiece holder does not interfere with the electrolytic sealing process.

Connected to workpiece holder 350 is machine connector 352, which is connected to a means to lower workpiece (lamination) 100 into the deposition electrolyte for sealing. For example, machine connector 352 may be directly or indirectly connected to a motor, a mechanical lever or other similar mechanisms that can effectively lower workpiece (lamination) 100 into and out of the deposition electrolytes.

Electrolytic sealing tool 300 may have additional components, such as a controller for controlling the electrolytic sealing tool. The controller (not shown) may be configured to receive and send various signals to control electrolytic sealing tool 300. For example, the controller may generate control signals that are sent to the deposition electrolyte systems 378, 330. The controller may also be adapted to receive signals from the deposition electrolyte systems 378, 330. For example, the controller may send signals and receive signals to control the speed of a pump or the concentration of the electrolytes 332 and 334 in the first and second electrolyte systems 378 and 330. Additionally, the controller may control the frequency, current and/or voltage of the power from the AC power supply 316.

Deburring tool 200 and electrolytic sealing tool 300 may be separate and distinct tools. Alternatively, deburring tool 200 and electrolytic sealing tool 300 may be a single tool. When a single tool, to switch from the deburring tool to the electrolytic sealing tool, the electrolyte on needs to be changed, which may be time consuming. For that reason, typically two separate tools are used.

To process a workpiece to be debarred and sealed, workpiece 100 is first subjected to electrolytic deburring using an electrolytic deburring tool 200, as exemplified in FIG. 3. Deburring removes burrs 21 (shown in FIG. 2) from perimeter edge 17 of workpiece 100. In addition to deburring the perimeter edge 17 workpiece 100, any metal particles embedded in and exposed through first coating 14 or second coating 16 of workpiece 100 are also removed. Metal particles may become embedded into coatings 14, 16 and exposed through coating 14, 16 or metal particles that may be on the surface of the coating 14, 16 are also removed in the deburring process.

Show in FIG. 3, workpiece 100 is placed in workpiece holder 250 such that workpiece 100 is held in place by workpiece holder 250 and will remain connected to workpiece holder 250 during the deburring process. Machine connector 252 lowers workpiece 100 and workpiece holder 250 towards tank 210 holding first electrolyte 232 and first electrode 224 on first cell 213, and second electrolyte 234 and second electrode 226 on second side 214 of the tank 210. Workpiece 100 simultaneously contacts first and second electrolytes 232, 234 and makes an electrical connection between first and second electrolytes 232, 234, through metal layer 12 (shown in FIG. 1) of lamination or workpiece 100. Generally, machine connector 252 will lower workpiece 100 into the electrolytes 232 and 234 such that workpiece 100 is a distance G, also referred as the "gap", from each of the first and second electrodes 224 and 226. For electrolytic deburring and cleaning, the distance G is generally in the range of between about 0.01 inches to about 0.05 inches. Once the electrical connection is made, alternating current (AC) is supplied to first electrode 224 and second electrode 226. Alternatively, AC may be provided to first and second electrodes 224, 226 prior to workpiece 100 is brought into contact with the first and second electrolytes. AC then flows within the deburring tool 200 such that first electrode 224 functions as the transient cathode and transient anode and the second electrode functions as the transient anode and transient cathode. As stated above, when first electrode 224 functions as the transient cathode, second electrode 226 functions as the transient anode. Similarly, when first electrode 224 functions as the transient anode, second electrode 226 functions as the transient cathode. First electrode 224 is in communication with first electrolyte 232, and second electrode 226 is in communication with the second electrolyte 234.

An electrical connection is made between first and second electrolytes 232, 234, by metal layer 12 of workpiece 100. First electrolyte 232 serves to carry the AC between the workpiece 100 and first electrode 224. Similarly, second electrolyte 234 serves to carry the AC between workpiece 100 and the second electrode. Depending on the direction of the current, which is continuously changing, the current either flows away from workpiece 100 towards each electrode 224, 226 or from each electrode towards 224, 226, towards workpiece 100. It is also noted that the current will flow in the opposite direction to or from workpiece, in an alternative manner, at each portion of workpiece depending on whether the portion of workpiece 100 is contact with the first or second electrolyte 232, 234. Two different processes occur, depending if the electrode is the transient cathode or transient electrode. To gain a better understanding of this, attention is directed to FIGS. 6 and 7.

Figure 6:
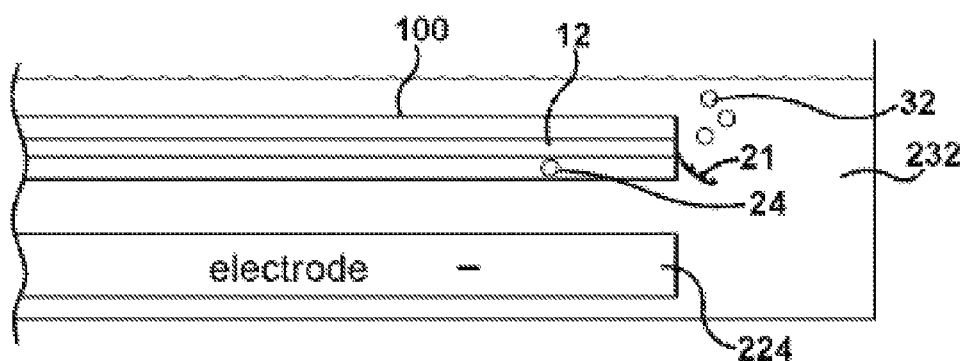
FIG. 6 shows an anodic dissolution process that occurs in the electrolytic deburring tool.

FIG. 6 shows an anodic dissolution process that occurs when the first electrode 224 is the transient cathode. Anodic dissolution removes burr 21 and embedded particles 24 from lamination or workpiece 100. Not wishing to be bound by theory, the process turns the metal of burr 21 or embedded particles 24 into metal hydroxides, such as iron hydroxide. Electrolyte 232, which is circulated through first cell 213, also serves to capture the metal hydroxide as well as metal residues away from workpiece 100 and into first electrolyte system 228, which may remove the metal hydroxides and metal residues from first electrolyte 232, prior to returning first electrolyte 232 to first cell 213. Anodic dissolution occurs when the portion of workpiece 100 is in a transient anode state and first electrode is in a transient cathode state. In the state when the portion of workpiece 100 in first electrolyte 232, and first electrode is the transient cathode, positive ions migrate from workpiece 100, which turns metal into metal hydroxides, through first electrolyte 232 to first electrode 224. In this state, the current flows from the AC power supply 216, through first wire 220, to first electrode 224, to first electrolyte 232 and to the portion of workpiece 100, which is in contact with first electrolyte 232.

Figure 7:
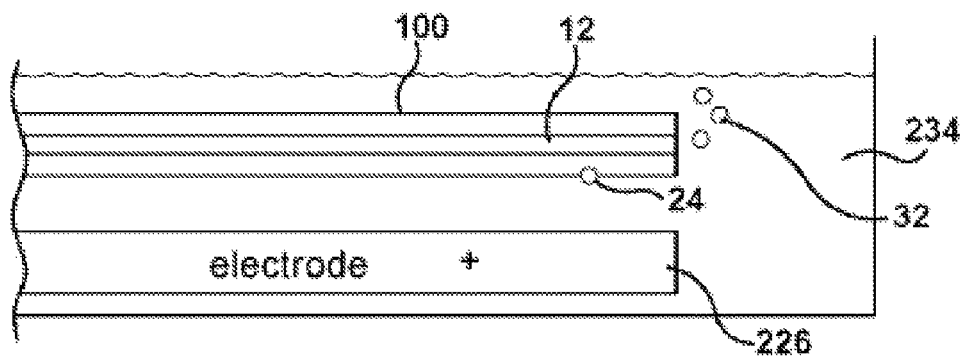
FIG. 7 shows a cathodic cleaning process that occurs in the electrolytic deburring tool.

FIG. 7 shows a cathodic cleaning process that occurs when second electrode 226 is the transient anode. Cathodic cleaning happens at a high pH and hydrogen gas generated which is purged. Cleaning process effectively may remove oils, and other organic contamination that may be present on the surface of the lamination. AC current flows from and through workpiece 100 to second electrolyte 234, then to second electrode 226 and to second wire 222 back to AC power supply 216. Positive ions migrate from second electrode 226 to workpiece 100. In addition, hydrogen gas bubbles 32 are generated near the exposed metal layer 12 of workpiece 100. Hydrogen gas bubbles serve to purge the surfaces and perimeter edge of workpiece 100 from contaminates. During cleaning, the perimeter edge of workpiece 100 becomes more basic as the hydrogen ions are depleted.

In the next cycle of the AC, first and second electrode 224, 226 reverse polarity such that first electrode 224 acts as the transient anode, and second electrode 226 acts as the transient cathode. Thus, the electrolytic deburring depicted in FIG. 6 occurs at second electrode 226, and the cleaning depicted in FIG. 7 occurs at the first electrode 224. As the AC continues to cycle, first and second electrodes 224 and 226 continue to switch between being transient cathodes and transient anodes, respectively. Thus, the use of AC provides for a symmetric electrochemical configuration of electrolytic deburring tool 200. The AC neutralizes the chemistry and surfaces associated with first and second electrolytes 232 and 234. Thus, the AC essentially provides for a neutral chemical potential that helps to prevent electrolytic corrosion of the components of electrolytic deburring tool 200. Alternation between the transient cathodes and transient anodes continues until the burrs 21 are removed from both portions of workpiece 100. The process of electrolytic deburring produces a perimeter edge of workpiece 100 that is clean, smooth, and essentially free of burrs 21.

Once workpiece 100 is debarred and cleaned, workpiece 100 is then optionally rinsed and dried. Workpiece 100 is then electrolytically sealed using an electrolytic sealing tool 300, as exemplified in FIG. 5.

Electrolytic sealing seals the perimeter edge of workpiece 100, where metal layer 12 is exposed along perimeter edge 17, by depositing sealer 18 on the exposed metal along perimeter edge 17, of the deburred lamination or work piece 199, as is shown in FIG. 1. In addition, electrolytic sealing also seals any exposed metal of metal layer 12 that may be exposed through layers 14 and/or 16 as a result of the deburring process, such as where the layers 14 and/or 16 are incomplete over the metal layer, where metal particles are removed during the electrolytic deburring process, or where layer 14 and/or 16 are damaged during processing. Such sealing is shown in FIG. 1 as sealer 19 applied to the second side 13 of metal layer 12, where metal layer 12 was exposed through layer 16. As such, electrolytic sealing is used to ensure that no metal is exposed on the lamination after cutting or stamping lamination 100 from a larger sheet of laminated metal. By sealing deburred workpiece 199, the resulting formed part is more resistant to corrosion from conditions in the machine in which the sealed workpiece is installed and may provide better resistance to electrical shorting in the machine due to insulation failure.

To gain an understanding of the electrolytic sealing process show in FIG. 5, workpiece 199, which has been deburred and clean using the deburring tool 200 shown in FIG. 3 in the process described above, is placed in workpiece holder 350 such that deburred workpiece 199 is held in place by workpiece holder 350 and will remain connected to workpiece holder 350 during the electrolytic sealing process. Machine connector 352 lowers deburred workpiece 199 and workpiece holder 350 towards tank 310 holding first electrolyte 332 and first electrode 324 in first section 313 of tank 310, and second electrolyte 334 and second electrode 326 in second section 314 of the tank 310. Deburred workpiece 199 simultaneously contacts first and second electrolytes 332, 334 and makes an electrical connection between first and second electrolytes 332, 334, through metal layer 12 (shown in FIG. 1) of deburred lamination or workpiece 199. Once the electrical connection is made, alternating current (AC) is supplied to first electrode 324 and second electrode 326. Alternatively, AC may be provided to first and second electrodes 324, 326 prior to deburred workpiece 199 is brought into contact with the first and second electrolytes 332, 334. AC then flows within the electrolytic sealing tool 300 such that first electrode 324 functions as the transient cathode and transient anode and second electrode 326 functions as the transient anode and transient cathode. As stated above, when first electrode 324 functions as the transient cathode, second electrode 326 functions as the transient anode. Similarly, when first electrode 324 functions as the transient anode, second electrode 326 functions as the transient cathode. First electrode 324 is in communication with first electrolyte 332, and second electrode 326 is in communication with the second electrolyte 334. Generally, machine connector 352 will lower workpiece 100 into the electrolytes 332 and 334 such that deburred workpiece 199 is a distance D, also referred as the "gap", from each of the first and second electrodes 324 and 326. For electrolytic sealing, the distance D is generally in the range of between about 0.05 inches to about 2.0 inches.

An electrical connection is made between first and second electrolytes 332, 334, by metal layer 12 of deburred workpiece 199. First electrolyte 332 serves to carry the AC between the workpiece 100 and first electrode 324. Similarly, second electrolyte 334 serves to carry the AC between deburred workpiece 199 and the second electrode 326. Depending on the direction of the current, which is continuously changing, the current either flows away from deburred workpiece 199 towards each electrode 324, 326 or from each electrode 324, 326, towards deburred workpiece 199. It is also noted that the current will flow in the opposite direction to or from deburred workpiece 199, in an alternative manner, at each portion of deburred workpiece 199 depending on the if the portion of deburred workpiece 199 is contact with the first or second electrolyte 332, 334. Two different processes occur, depending if the electrode is the transient cathode or transient electrode. One process is cathodic phosphating, which occurs when deburred workpiece 199 acts as a transient cathode, in the presence of the transient anode electrode. The other process is anodic phosphating, which occurs when deburred workpiece 199 acts as the transient anode, in the presence of the transient cathode electrode. In both cathodic phospating and anodic phosphating, phosphates are deposited on the exposed metal 12 of deburred lamination 199, which results in a sealed deburred workpiece. Alternatively, the phosphate may react with the metal of metal layer 12 to form a metal phosphate on the metal layer in a process called conversion.

In each of the electrolytic deburring/cleaning process and the electrolytic sealing process, the workpiece 100, 199 is contacted with the electrolytes of each process such that the workpiece 100, 199 is in a horizontal/planner configuration, as is shown in FIGS. 3 and 5. It is also possible that the workpiece could be introduced in the respective electrolytes in a vertical position. In that configuration, the electrodes would also be positioned vertically to maintain the desired gap.

The electrodes used in each of the sides (cells) of the tank may be shaped to a shape that is similar to the workpiece being processed or may have a general shape of a flat plate, such as a rectangle or a square. Also, each of the electrodes may be provided with a supply hole which 250, 350, 251 and 351 in FIGS. 3 and 5, which allows the electrolyte to enter the cells of tank 210 or 310. Each electrode 224, 324, 226 and 326 may be provided with a single supply hole 250, 251, 350, 351 or may have multiple supply holes (not shown) where the electrolyte is supplied to the tank 210, 310.

Figure 8:
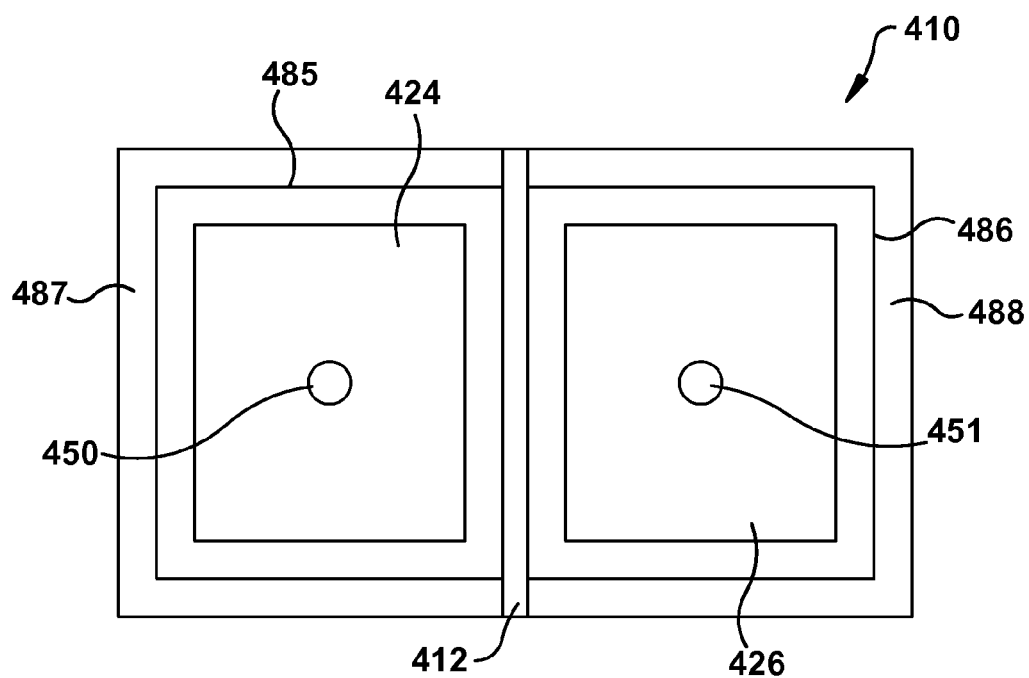
FIG. 8 shows a tank having a divider in the lateral direction along the tank.

To gain a better understanding of the configuration of each tank, attention is directed to FIG. 8, where tank 410 is shown. Tank 410 may be tank 210 and/or tank 310 and FIG. 8 is used to view possible configurations of each tank 210 and 310. Each electrode 424, 426, which may be electrodes 224 and 226, respectively, in the deburring and cleaning process or electrodes 324 and 326, respectively, in the electrolytic sealing process. Each electrode 424 and 426 may be provided with a supply hole, 450, 451 respectively, which supplies the electrolyte to each side of the tank. By providing the electrolyte through the electrodes, the electrolyte flows from the supply hole 450, 451 in the electrode to the perimeter edges of the lamination or work piece processed using each process. In addition, the influx of the electrolyte causes the electrolyte to flow worked the outer edges 485, 486 of each cell to the trap or overflow channel 487, 488 to return the electrolyte to the electrolyte systems for processing as is described above.

Figure 9:
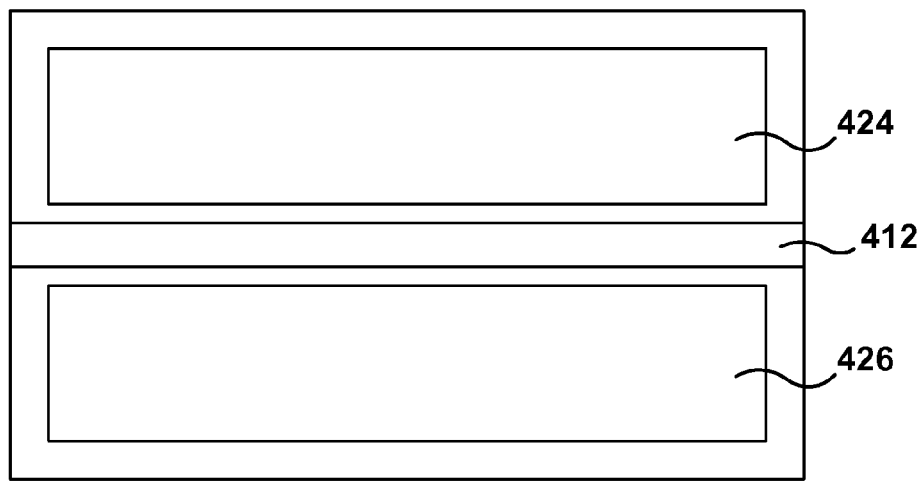
FIG. 9 shows a tank having a divider in the longitudinal direction of the tank.

As shown in FIG. 8, divider 412, which may be divider 212 or divider 312, is shown to be in the lateral direction across the length or longest side of the tank. Alternatively, as shown in FIG. 9, divider 412 may be placed lengthwise in the tank, or across the shortest distance of the tank. It is also possible that each of the deburring and cleaning process, as well as the electrolytic sealing process use multiple tanks to ensure that all of the workpiece is processed. That is, the workpiece is deburred and cleaned a two-step process using two separate tanks, where one tank has a configuration shown in FIG. 8 and the other has a configuration shown in FIG. 9. Similarly, the electrolytic sealing process may be a two-step process using two tanks, one has a configuration shown in FIG. 8 and the other has a configuration shown in FIG. 9.

Figure 10:
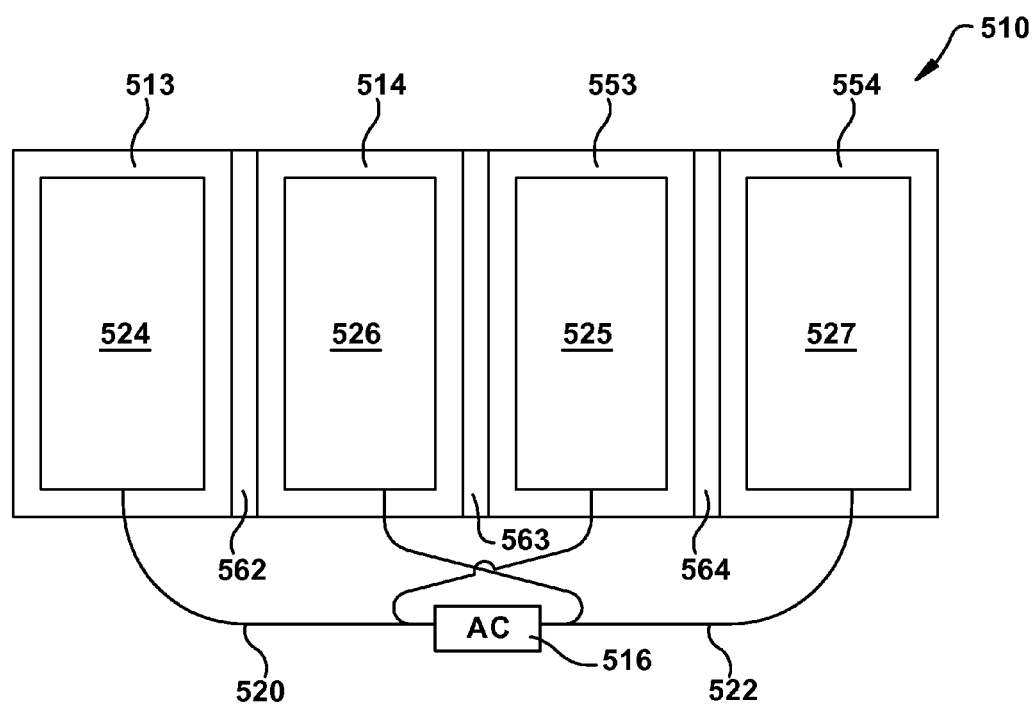
FIG. 10 shows a tank having more than two cells.

In a further embodiment, each tank used in the deburring and cleaning process and/or the electrolytic sealing process may have more than two cells. Attention is directed to FIG. 10, which shows a tank 510 with more than two cells. Tank 510 has 4 cells, 513, 514, 553 and 554. Each cell is divided from the adjacent cell by a divider 562, 563 or 564. Divider 562 divides cell 524 from cell 526. Divider 563 divides cell 526 from cell 525 and divider 564 divides cell 525 from cell 527. Cell 513 contains electrode 524, cell 514 contains electrode 526, cell 553 contains electrode 525 and cell 554 contains electrode 527. The number of cells can be any even number of cell greater than 2. For example, there may be 4 cells, as shown in FIG. 10, 6 cell, 8 cells 10 cells, etc. As shown, two of the cells 524, 525 are connected to wire 520, from AC power supply 516. Cells 526 and 527 are connected to wire 522 from AC power supply 516. This results in a tank having cells of different current flow in adjacent cells. As shown, the configuration is an A, B, A, B, configuration where cells 524 and 525 are A cells and cells 526 and 527 are B cells. The electrolyte from the A cells can be handled by one a first electrolyte system and the electrolyte for the B cells can be handled by a second electrolyte system. By using multiple cells, the metal layer of the workpiece becomes a multi-sectional wire, which shortens the distance the AC must travel through the metal layer.

Although the present invention has been described with reference to various embodiments, those skilled in the art will recognize that changes may be made in form and detail without departing from the spirit and scope of the invention. As such, it is intended that the foregoing detailed description be regarded as illustrative rather than limiting and that it is the appended claims, including all equivalents thereof, which are intended to define the scope of the invention.

What is claimed is:

1. A sealed laminated metal structure comprising:
   a lamination including a metal layer, the metal layer having a first surface and an opposite second surface;
   a material laminated on each of the first and second surfaces of the metal layer, wherein the lamination is removed from a larger laminated sheet of metal, the lamination having a perimeter edge with an exposed portion of the metal layer positioned at least partially along the perimeter edge, and the lamination being subjected to alternating current electrolytic deburring and cleaning to remove any burrs along the perimeter edge; and
   a sealer comprising a phosphate compound deposited on an exposed portion of the metal layer, wherein the phosphate compound comprises one of zinc phosphate or manganese phosphate.

2. The sealed laminated metal structure according to claim 1, wherein the material laminated to each of the first surface and the second surface of the metal layer comprises an insulation coating, and the sealer is further applied to the exposed portion of the metal layer of the laminated metal structure through the insulation coating as a result of the alternating current electrolytic deburring and cleaning.

3. The sealed laminated metal structure of claim 1, wherein the sealer further includes a product yielded from one of an alternating current electrolytic deposition or an alternating current electrolytic conversion.

4. The sealed laminated metal structure of claim 1, wherein the zinc phosphate or manganese phosphate of the sealer is applied by an alternating current electrolytic deposition.

5. A sealed laminated metal structure comprising:
   a lamination comprising a metal layer, the metal layer having a first surface and an opposite second surface;
   a first electrically insulative coating laminated onto the first surface of the metal layer;
   a second electrically insulative coating laminated onto the second surface of the metal layer, the lamination having a perimeter edge with an exposed portion of the metal layer positioned at least partially along the perimeter edge, wherein the lamination is subject to alternating current electrolytic deburring and cleaning to remove burrs from the perimeter edge thereof; and
   a sealer comprising a zinc phosphate or a manganese phosphate compound deposited on the perimeter edge and the exposed portion of the metal layer.

6. The sealed laminated metal structure of claim 5, wherein the first electrically insulative coating entirely covers the first surface of the metal layer, the second electrically insulative coating entirely covers the second surface of the metal layer, and wherein the sealer entirely covers the perimeter edge and the exposed portion of the metal layer therein.

7. The sealed laminated metal structure of claim 5, wherein one of the first or second electrically insulative coatings includes one of a C3 coating material or a C5 coating material.

8. The sealed laminated metal structure of claim 5, wherein each of the first and second electrically insulative coatings includes a multi-layer coating material.

9. The sealed laminated metal structure of claim 5, wherein the sealer contacts the exposed portion of the metal layer, the exposed portion of the metal layer having been exposed by application of alternating current electrolytic deburring and cleaning.

10. The sealed laminated metal structure of claim 5, wherein the perimeter edge of the metal layer is free of burrs thereon.

11. The sealed laminated metal structure of claim 5, further comprising a transient electrode separated from the lamination by an electrolyte.

* * * * *

UNITED STATES PATENT AND TRADEMARK OFFICE
CERTIFICATE OF CORRECTION

PATENT NO. : 9,963,798 B2
APPLICATION NO. : 14/797700
DATED : May 8, 2018
INVENTOR(S) : Yuefeng Luo et al.

It is certified that error appears in the above-identified patent and that said Letters Patent is hereby corrected as shown below:

In the Specification

Column 11, Line 1 and Column 12, Line 54, the misspelled word "debarred" should be changed to --deburred--.

Signed and Sealed this
Tenth Day of July, 2018

Andrei Iancu
*Director of the United States Patent and Trademark Office*